United States Patent Office 3,806,454
Patented Apr. 23, 1974

3,806,454
PROCESS FOR PREPARING BARIUM-
CONTAINING DISPERSION
Roy C. Sias, Ponca City, Okla., assignor to
Witco Chemical Corporation, New York, N.Y.
No Drawing. Filed May 12, 1971, Ser. No. 148,265
Int. Cl. C10m 1/40, 3/34
U.S. Cl. 252—33.4                           36 Claims

ABSTRACT OF THE DISCLOSURE

Process for preparing a highly basic barium-containing dispersion wherein the process comprises: (a) forming an admixture of oil-soluble dispersing agent, nonvolatile diluent, process solvent, an alcoholic solution of basic barium compound in sufficient amount to provide a stoichiometric excess of barium in the admixture and water; (b) carbonating the admixture while it is maintained at a temperature of about 80 to about 100° C., wherein the amount of carbonation is from about 50 to about 85 percent of the total amount required to convert the excess barium present to barium carbonate; (c) heating the carbonated admixture to a temperature higher than that of step (b) and adding the remainder of the amount of $CO_2$ required to convert the excess barium to barium carbonate; and (d) heating the carbonated admixture to remove the volatile materials present.

DISCLOSURE

Background

The present invention relates to an improved process for preparing a composition comprising a dispersion of barium carbonate in a nonvolatile diluent. The composition has an unusually high concentration of barium carbonate. Compositions of this general type are known by various names such as "overbased" dispersions and "highly basic" dispersions.

Many uses are known for highly basic barium dispersions. They are particularly useful in lubricating oil compositions for use in diesel and other internal combustion engines. More recently, they have been used as smoke suppressant additives in diesel fuels. Generally, the highly basic barium dispersions which have been used as smoke suppressant additives contain large amounts (e.g. above about 20 percent) dispersed barium compounds. Since the product of the process of my invention contains a high concentration of barium carbonate it is particularly useful as a smoke suppressant additive in diesel fuels.

Two methods of stating the amount of dispersed barium compounds (e.g. barium carbonate or barium hydroxide) have been used in this field. One method states the dispersed barium carbonate as the "base number" which refers to milligrams of potassium hydroxide per gram of sample. Preferably the base number is an acetic base number referring to an acetic acid titration method which utilizes glacial acetic acid as the solvent and a solution of perchloric acid in glacial acetic acid as the titrant.
A second method uses the term "metal ratio" which is defined as the ratio of the total equivalents of barium in the composition to the equivalents of barium theoretically combinable as a normal salt with the organic acid (e.g. sulfonic acid) present. Metal ratio is thus a measure of the stoichiometric excess of barium in the composition.

The "base number" method is preferred herein since it is relatively easy to determine and it is independent of the "percent active" of the sulfonic acid.

Prior art

Robert L. Carlyle in U.S. 2,861,951 teaches a process for dispersing barium carbonate in a nonvolatile carrier wherein the process uses an aliphatic $C_1$–$C_3$ alcohol solution of an oil-insoluble barium inorganic base (e.g. barium oxide). The highest base number taught by Carlyle is 133.

Raymond C. Schlicht et al. in U.S. 3,057,896 teach a process for preparing hyperbasic sulfonates (including barium sulfonates) wherein the process uses a lower alkanol, water or a lower alkoxy ethanol. With regard to barium sulfonates, the highest metal ratio taught is 1.6.

British Pat. No. 1,108,661, teaches a process for preparing hyperbasic barium sulfonates wherein the process uses a glycol ether solution of barium oxide. In Example 17, a two-step procedure of adding the glycol ether solution of BaO is used. Ninety-five percent of the total requirement is added initially, after which the solution is carbonated. Then the remaining five percent of the glycol ether solution of BaO is added followed by carbonation. The product of this example shows an acetic base number of 67.

Gerald L. Nield in U.S. 3,525,599 teaches a process for preparing a barium carbonate dispersion containing an unusually high concentration of barium carbonate. According to the process of this patent, all of the alcoholic solution of basic barium compound is added to the initial admixtures. The patent is very specific in that it requires the use of an amine salt of an oil-soluble organic acid (e.g., a sulfonic acid).

U.S. Pat. No. 3,691,075, which is based on copending application Ser. No. 68,566, filed Aug. 31, 1970, of which I am the inventor, concerns a process for preparing a highly basic barium-containing dispersion. According to the process of said patent, the alcoholic solution of basic barium compound is added in two stages and at different temperatures.

It is believed to be readily apparent that none of the foregoing teach the combination of steps which forms the process of my invention.

A search of the prior art produced the following U.S. patents as being representative of the art: 2,791,558; 2,846,466; 2,881,206; 2,961,403; 3,007,868; 3,170,880; 3,170,881; and 3,312,618. Inasmuch as these patents are of less pertinency than the references discussed in the foregoing it is not considered necessary to discuss them.

BRIEF SUMMARY OF MY INVENTION

Broadly stated, the present invention concerns a process for preparing a highly basic barium-containing dispersion wherein the process comprises:

(a) forming an admixture of:
   (1) oil-soluble dispersing agent,
   (2) nonvolatile diluent,
   (3) process solvent, (4) alcoholic solution of basic barium compound in sufficient amount to provide a stoichiometric excess of barium in the admixture, and
(5) from about 0.25 to about 3 moles of water per mole of excess (overbasing) barium present;
(b) carbonating the admixture while it is maintained at a temperature of about 80 to about 100° wherein the amount of carbonation is from about 50 to about 85 percent of the total amount required to convert the excess barium present to barium carbonate;
(c) heating the carbonated admixture to a temperature higher than that of step (b) and adding the remainder of the amount of carbon dioxide required to substantially convert the excess barium to barium carbonate; and
(d) heating the carbonated admixture to remove the volatile materials present.

When the alcohol used to prepare the alcoholic solution of basic barium compound is an ether alcohol, preferably the process comprises:

(a) forming an admixture of oil-soluble dispersing agent, nonvolatile diluent, process solvent, and from about 0.25 to about 3 moles of water per mole of excess (overbasing) barium used in the process;
(b) heating the admixture to a temperature of from about 20 to about 60° C. and adding thereto an ether alcohol solution of basic barium compound in sufficient amount to provide a stoichiometric excess of barium in the admixture;
(c) carbonating the admixture while it is maintained at a temperature of from about 80 to about 100° C., with the amount of carbonation being from about 50 to about 85 percent of the amount required to convert the excess barium present to barium carbonate;
(d) heating the carbonated admixture to a temperature in the range of about 115 to about 130° C. and adding thereto the remainder of the amount of $CO_2$ required to substantially convert the excess barium to barium carbonate; and
(e) heating the carbonated admixture to remove the volatile materials present.

When the alcohol used to form the alcoholic solution of basic barium compound is an aliphatic monohydric alcohol, preferably the process comprises:

(a) forming an admixture of oil-soluble dispersing agent, nonvolatile diluent and process solvent;
(b) adding to the admixture an aliphatic monohydric alcoholic solution of basic barium compound in sufficient amount to provide a stoichiometric excess of barium in the admixture;
(c) heating the admixture to a temperature of from about 80 to about 100° C. and adding thereto from about 0.25 to about 3 moles of water per mole of excess (overbasing) barium present;
(d) carbonating the admixture while it is maintained at a temperature of from about 80 to about 100° C., with the amount of carbonation being from about 50 to about 85 percent of the amount required to convert the excess barium present to barium carbonate;
(e) heating the carbonated admixture to a temperature in the range of about 115 to about 130° C. and adding thereto the remainder of the amount of $CO_2$ required to substantially convert the excess barium to barium carbonate; and
(f) heating the carbonated admixture to remove the volatile materials present.

In some instances, the process includes the additional step of steam-stripping the product. Preferably, this steam-stripping is done concurrently with the second carbonation.

In one aspect the present invention relates to a lubricating composition containing an effective amount of the product prepared by the processes described in the foregoing.

In another aspect the present invention relates to a hydrocarbon fuel composition containing an effective amount of the product prepared by the processes described in the foregoing.

It should be emphasized at this time that the product of my invention is characterized as having a high base number (for example at least 140, preferably at least 180) while still being fluid at ambient temperatures.

DETAILED DESCRIPTION

Materials used

Suitable oil-soluble dispersing agents include the oil-soluble sulfonic acids, carboxylic acids, and the metal salts thereof. The term "oil-soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil-soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonic acids can be derived from either alkyl or alkaryl hydrocarbons. In addition, they can be derived from hydrocarbons having cycloalkyl (i.e., naphthenic) groups attached in the side chains attached to the benzene ring. The alkyl groups in the alkaryl hydrocarbons can be straight or branched chain. The alkaryl radical can be derived from benzene, toluene, ethyl benzene, xylene isomers, or naphthalene.

An example of a hydrocarbon feedstock which has been particularly useful in preparing synthetic sulfonic acids is a material known as postdodecylbenzene. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D-158 Engler (° F.): | |
| I.B.P. | 647 |
| 5 | 682 |
| 50 | 715 |
| 90 | 760 |
| 95 | 775 |
| F.B.P. | 779 |
| Refractive index at 23° C. | 1.4900 |
| Viscosity at (centistokes)— | |
| −10° C. | 2,800 |
| 20° C. | 280 |
| 40° C. | 78 |
| 80° C. | 18 |
| Aniline point, ° C. | 69 |
| Pour point, ° F. | −25 |

An example of another hydrocarbon feedstock which is particularly useful in preparing synthetic sulfonic acids is a material referred to as "dimer alkylate." "Dimer alkylate" has a long, branched-chain alkyl group. Briefly described, dimer alkylate is prepared by the following steps:

(1) dimerization of a suitable feedstock, such as cat poly gasoline, and
(2) alkylation of an aromatic hydrocarbon with the dimer formed in step (1).

Preferably, the dimerization step uses a Friedel-Crafts alkylation sludge as the catalyst. This process and the resulting product are described in U.S. Pat. No. 3,410,925.

An example of another hydrocarbon feedstock which is particularly useful for preparing synthetic sulfonic acids which can be used in my invention is a material which I refer to as "NAB Bottoms." NAB Bottoms are predominantly di-n-alkyl aromatic hydrocarbon wherein the alkyl groups contain from 8 to 18 carbon atoms. They are distinguished primarily from the preceding sulfonation feedstocks in that they are straight chain and contain a large amount of di-substituted material. A process of preparing these materials and the resulting product are described in application Ser. No. 62,211, filed Aug. 7, 1970, and being a continuation-in-part of application Ser. No. 529,284, filed Feb. 23, 1966, and now abandoned. Application Ser. Nos. 62,211 and 529,284 have the same assignee as the present application. The product is also described in U.S. Pat. No. 3,288,716, which is concerned with an additional use for the product, other than sulfonation feedstock.

Another process of preparing these materials is described in application Ser. No. 53,352, filed Aug. 6, 1970, and having the same assignee as the present application. Application Ser. No. 53,352 is a continuation-in-part of application Ser. No. 529,284.

Still another process of preparing a di-n-alkaryl product is described in application Ser. No. 104,476, filed Jan. 7, 1971, which is a continuation-in-part of application Ser. No. 521,794, filed Jan. 20, 1966, and now abandoned.

In order to make my disclosure even more complete, U.S. Pat. No. 3,410,925 and application Ser. Nos. 53,352; 62,211 and 104,476 are made a part of this disclosure.

The oil-soluble sulfonic acids are preferred for use in my process.

In addition to the sulfonic acids derived from the foregoing-described hydrocarbon feedstock, examples of other suitable sulfonic acids include the following: mono- and poly-wax-substituted naphthalene sulfonic acid, dinonyl naphthalene sulfonic acid, diphenyl ether sulfonic acid, naphthalene disulfide sulfonic acid, dicetyl thianthrene sulfonic acid, dilauryl beta-naphthol sulfonic acid, dicapryl nitronaphthalene sulfonic acid, unsaturated paraffin wax sulfonic acid, hydroxy substituted paraffin wax sulfonic acid, tetraamylene sulfonic acid, mono- and polychlorosubstituted paraffin wax sulfonic acid, nitrosoparaffin wax sulfonic acid; cycloaliphatic sulfonic acid such as lauryl-cyclohexyl sulfonic acid, mono- and poly-wax-substituted cyclohexyl sulfonic acid, and the like.

Suitable carboxylic acids which can be used in preparing the colloidal dispersion used as a starting material include naphthenic acids, such as the substituted cyclopentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyl-octahydro indene carboxylic acids and the like and oil-soluble salts thereof. Suitable oil-soluble fatty acids are those containing at least 8 carbon atoms. For producing the object of this invention in liquid form, I prefer fatty acids which are liquids at ambient temperatures down to about 15° C. Specific examples include 2-ethyl hexanoic acid, pelargonic acid, oleic acid, palmitoleic acid, linoleic acid and riconoleic acid. Naturally occurring mixtures of predominantly unsaturated fatty acids, such as tall oil fatty acids, are particularly suitable. Examples of commercially available tall oil fatty acids include the "Crofatols," available from Crosby Chemical Company and the "Acintols," available from Arizona Chemical Company.

While in general almost any metal can be used to form the oil-soluble metal sulfonate or oil-soluble metal carboxylate, from a commercial standpoint the metal is restricted to the alkali and alkaline earth metals, with barium being preferred.

It may be well to mention here that usually commercial sulfonic acids and sulfonates are not 100 percent acid or sulfonate. Instead, they are a mixture of sulfonic acid, or sulfonates with a nonvolatile diluent oil. For example the term "40% active sulfonic acid" refers to a composition containing 40% sulfonic acid.

A wide variety of nonvolatile diluents are suitable in the process of my invention. The principal requisites desired in the nonvolatile diluent are that it will act as a solvent for the dispersing agent which is used and has a boiling point of 160° C. and above. Suitable nonvolatile diluents include materials boiling in the lubricating oil range and lower boiling refinery hydrocarbon streams, such as Stoddard solvent and diesel fuels. Examples of nonvolatile diluents boiling in the lubricating oil range which can be used include mineral lubricating oils obtained by any of the conventional refining procedures; synthetic lubrication oils, such as polymers of propylene, polyoxyalkylenes, polyoxypropylene, dicarboxylic acid esters, and esters of phosphorus; synthetic hydrocarbon lubricating oils, such as dialkylbenzenes, diphenylalkanes, alkylated tetrahydronaphthalenes, and mixtures of these materials; vegetable oils, such as corn oil, cotton seed oil, and castor oil; and animal oils, such as lard oil and sperm oil. Of the nonvolatile diluents described hereinbefore, the mineral lubricating oils and the synthetic lubricating oils are considered more suitable, with the mineral lubricating oils being preferred.

In order to make my disclosure more complete, A.P.I. gravity and distillation ranges for two suitable refinery hydrocarbon streams boiling at 160° C. and above are shown below.

| | | No. 2 |
|---|---|---|
| Stoddard solvent: | | Diesel fuel |
| Gravity, A.P.I., 48° | | 36 |
| Initial B.P. (160° C.) | | 191 |
| 10% (168° C.) | | 218 |
| 50% (177° C.) | | 259 |
| 90% (191° C.) | | 302 |
| End-point (210° C.) | | 329 |

Suitable basic barium compounds for use in my invention include barium oxide and barium hydroxide, with barium oxide being preferred. Since, probably, a solution of the basic barium compound in the alcohol includes some in situ formed barium alcoholate, it is to be understood that the term basic barium compound includes these materials.

Alcohols which are suitable in my process are those in which the basic barium compound has an appreciable solubility. We have found suitable alcohols to be the following: aliphatic monohydric alcohols having from one to five carbon atoms, and ether alcohols containing three or four carbon atoms.

Specific examples of suitable alcohols include methanol, ethanol, propanol, isopropanol, butanol, isobutanol, pentanols, methoxy ethanol, ethoxy ethanol, and methoxy isopropanol.

The more suitable alcohols for use in my process are methanol, methoxy ethanol and ethoxy ethanol.

The concentration of the basic barium compound in the alcohol can vary over a wide range. Generally it is preferable to use a solution having a concentration approaching maximum solubility in the particular alcohol used, since less storage is required. When using the primary aliphatic alcohols it is particularly desirable to use a fairly concentrated solution since these cannot be used as a process solvent. The maximum solubility of barium oxide in the lower alkanols is about 18.5% (wt.)—expressed as barium. Generally, when using these alcohols the preferable amount of barium oxide corresponds to about 12 to about 16 percent by weight barium.

The solubility of barium oxide in the ether alcohols is greater than in the primary aliphatic alcohols. The maximum solubility is about 30.5 percent by weight as barium. Generally, when using the ether alcohols it is preferable that they have a barium concentration of about 19 to about 25 weight percent.

For some reason a process solvent is desirable in the process of my invention. A primary requisite of the process solvent is that it have a boiling point below 150° C., which is the maximum temperature used in my process. Examples of suitable process solvents include petroleum naphtha, hexane, heptane, octane, benzene, toluene, xylene, and the ether alcohols, defined hereinbefore. In this connection it is of interest that the lower primary aliphatic alcohols are not suitable for use as a process solvent in the instant process.

AMOUNTS OF MATERIALS USED

The amounts of oil-soluble dispersing agent, nonvolatile diluent and basic barium compound are shown in the table below in parts by weight.

|  | Suitable | Preferred |
|---|---|---|
| Dispersing agent | 5-55 | 10-30 |
| Nonvolatile diluent | 15-85 | 20-70 |
| Basic compound (as barium) | 10-55 | 20-40 |

The amount of process solvent is at least about 40 percent by weight, preferably at least about 80 percent by weight of the combined amount of dispersing agent, nonvolatile diluent, and alcoholic solution of basic barium compound. Usually, the upper amount of process solvent, on the same basis, is below 110 percent by weight. Amounts larger than this can be used but usually are not economically feasible. Stated in another way, the amount of process solvent is at least about 4 parts, preferably at least about 7 parts, by weight per part of total barium compound (as barium) used. Usually, the upper amount of process solvent, stated on this latter-defined basis, is below 9 parts.

The amount of water used is a matter of some importance, and is somewhat dependent upon the amount of barium added initially to the admixture. (The amount of barium added initially is discussed in "Process Conditions.") A suitable amount of water is from about 0.25 to about 3.00 moles per mole of excess (overbasing) barium added. Preferably, the amount of water is from about 0.40 to about 1.6 moles on the same basis. In general, if too little water is used the final product is viscous or semi-solid, and sometimes contains gel particles or has a high B.S. & W. On the other hand, if too much water is used the product is usually hazy with a high B.S. & W.

PRODUCT PRODUCED BY MY INVENTION

As stated previously herein the product of my invention has a very high base number while still being fluid at ambient temperatures. This is considered an unusual feature when the product uses a nonvolatile diluent boiling in the lubricating oil range. More specifically, the product of my invention suitably was an acetic base number of at least 140, more suitable at least 150, and preferably at least 180. Expressed as metal ratio, my product can have a metal ratio of at least 5:1; usually, it is higher. Still further, the product of my invention can have a base number of at least 140 while always having a viscosity below 1600 centistokes at 100° F., more usually below 800 centistokes at 100° F., and often below 400 centistokes at 100° F. In many instances the product of my invention can have a base number of at least 180 while having a viscosity of below 1600 centistokes at 100° F.

In addition to the foregoing properties the product of my invention is clear (i.e. transmits direct light) and has a good B.S. & W. test (i.e. no sediment on dilution in petroleum naphtha).

PROCESS CONDITIONS

In conducting the process of my invention, an admixture is formed of the oil-soluble dispersing agent, nonvolatile diluent, process solvent, alcoholic solution of basic barium compound and water. The amount of the alcoholic solution of basic barium compound is sufficient to provide a stoichiometric excess of barium in the admixture. (The amount of the alcoholic solution is within the range stated in the foregoing.) The amount of water used has been specified in the foregoing.

The nature of the alcohol used to form the alcoholic solution of basic barium compound has an influence on the preferred methods of conducting my process. In all instances an admixture is formed of the oil-soluble dispersing agent, nonvolatile diluent and process solvent (the basic admixture). When the alcohol used is an ether alcohol the required amount of water and the required amount of alcoholic solution of basic barium compound are added to the basic admixture, with the temperature at the time of adding the alcoholic solution of basic barium being any temperature from ambient (i.e., about 20° C.) to about 100° C.

When the alcohol used to form the alcoholic solution of basic barium compound is an aliphatic monohydric alcohol preferably the following procedure is used. First, the required amount of the alcoholic solution of basic barium compound is added to the admixture of oil-soluble dispersing agent, nonvolatile diluent, and process solvent. The resulting admixture is then heated to a temperature in the range of from about 80 to about 100° C. whereupon the required amount of water is added.

The admixture is carbonated, preferably by blowing with gaseous $CO_2$ while it is maintained at a temperature in the range of from about 80 to about 100° C., preferably from about 88 to about 92° C. The degree of carbonation at this point is from about 50 to about 90 percent, preferably from about 60 to about 70 percent of the amount required to convert the excess barium present to barium carbonate.

The carbonated admixture is then heated to a temperature above that of the first carbonation, whereupon the remainder of the amount of $CO_2$ required to substantially convert the excess barium to barium carbonate is added. In order to assure conversion of the barium to barium carbonate in some instances it is desirable to add from 5 to 20% excess of the stoichiometric requirement of $CO_2$. The temperature of the second carbonation step preferably is from about 115 to about 130° C., more preferably from about 118 to about 123° C.

Following the second carbonation step the admixture is heated to a suitable temperature to remove the volatile materials present. Generally, the admixture is heated to about 150° C. at this point. While not necessary, usually the admixture is blown with $CO_2$ gas during the final heating step.

In order to disclose more clearly the nature of the present invention and the advantage thereof, reference will hereinafter be made to certain specific embodiments which illustrate the flexibility of the herein described portion. It should be clearly understood, however, that this is done solely by way of example and is not to be construed as a limitation of the spirit and scope of the appended claims.

EXAMPLE 1

This example illustrates the preparation of a highly basic barium-containing dispersion using the preferred conditions of my process and using a methanolic solution of barium oxide.

Materials used:

| | G. |
|---|---|
| Sulfonic Acid "A" [1] | 72.6 |
| Sulfonic Acid "B" [2] | 39.6 |
| Naphthenic diluent oil [3] | 69.2 |
| Methoxy ethanol [4] | 325 |
| Methanolic solution of BaO [5] | 333 |
| Water, 6.5 ml.[6] | |

[1] This material was a hexane solution of sulfonic acid prepared from an alkylbenzene which was prepared by alkylating benzene with an α-olefin mixture wherein the olefins contained over 20 carbon atoms and were predominantly straight-chain. The acid had the following analysis:

| Combining weight (as acid) | 520 |
|---|---|
| Sulfonic acidity, meq./g. | 0.490 |
| Nonvolatiles, weight percent | 32.7 |

[2] This material was a hexane solution of a sulfonic acid prepared from an alkylbenzene which was predominantly di-n-alkylbenzene. The acid had the following analysis:

| Combining weight (as acid) | 450 |
|---|---|
| Total acidity, meq./g. | 0.706 |
| Sulfonic acidity, meq./g. | 0.690 |
| Nonvolatiles, weight percent | 32.5 |

[3] Having a viscosity of 150 SSU at 100° F.
[4] Process solvent.
[5] Containing 14.8 percent by weight barium.
[6] This provided an amount of water equal to 1.1 mole per mole of overbasing barium.

Process: The sulfonic acids, naphthenic diluent oil and methoxy ethanol were added to a reaction vessel. While admixing the materials with mechanical agitation the admixture was heated to 45–55° C. whereupon the entire amount of the methanolic solution of barium oxide was added over a period of about 10 minutes. The resulting admixture was heated to a pot temperature of 90° C. (This resulted in removal of some volatiles) whereupon the water was added. After mixing the resulting admixture it was then blown with gaseous $CO_2$ for 18.3 minutes (rate 265 ml. per minute). Blowing with $CO_2$ was discontinued and the partially carbonated admixture was heated to a pot temperature of 120° C. (This resulted in removal of additional volatile material.) While maintaining the temperature at about 120° C., it was again blown with gaseous $CO_2$ over a period of about 15 minutes (170 ml. $CO_2$ per minute). While continuing to blow the carbonated admixture with $CO_2$ gas it was heated to a pot temperature of 150° C. to remove substantially all of the remainder of the volatile materials. While maintaining the temperature in the range of 150–155° C. the admixture was blown with $CO_2$ for 30 minutes.

The resulting product was bright and fluid and had the following analysis:

| Base number, acetic | 205 |
|---|---|
| Barium, weight percent | 26.7 |
| B.S. & W., percent | 0.06 |
| Viscosity, 210° F., cs. | 27.78 |
| Viscosity, 100° F., cs. | 304.9 |
| Compatibility (bright stock) | OK |

EXAMPLES 2–6

A series of runs were made employing substantially the same materials as used in Example 1. The sulfonic acids were prepared from the same alkylate but varied slightly in composition. The diluent oil was naphthenic oil described in Example 1 or a 100 pale oil (which is a mineral lubricating oil having a viscosity at 100° F. of 100 SSU).

The amount of water and the degree of carbonation in the first carbonation step differed in the series examples. The process conditons and the appearance and composition of the resulting product are shown in the table which follows.

TABLE I

| Example number | 2 | 3 | 4 | 5 | 6 |
|---|---|---|---|---|---|
| Process conditions:[a] | | | | | |
| Active, percent | 20 | 20 | 20 | 20 | 20 |
| Base No., acetic [1] | 210 | 210 | 210 | 205 | 205 |
| Mole $H_2O$/mole overbasing Ba | 1.0 | 1.1 | 1.1 | 1.2 | 1.2 |
| Percent carbonation at 90° C. | 66 | 62 | 70 | 66 | 62 |
| Diluent oil: | | | | | |
| 100 pale oil | X | | | X | X |
| Napthenic oil | | X | X | | |
| Product: | | | | | |
| Appearance | [3] | [3] | [3] | [3] | [3] |
| Base No., acetic [2] | 202 | 208 | 206 | 209 | 200 |
| Percent Ba | 26.9 | 28.1 | 27.8 | 28.3 | 27.3 |
| Percent B.S. & W. | 0.08 | 0.06 | 0.08 | 0.06 | 0.05 |
| Viscosity at 210° F., cs. | 39.59 | 30.33 | 51.14 | | 37.40 |
| Viscosity at 100° F., cs. | | 350.8 | 731.9 | | 309.0 |
| Compatibility (bright stock) | OK | OK | OK | OK | OK |

[1] Target. [2] Actual. [3] Bright.

EXAMPLE 7

This example illustrates the preparation of a highly basic barium-containing dispersion using the preferred conditions of my process and using a methoxy ethanol solution of barium oxide.

Materials used:

| | G. |
|---|---|
| Sulfonic acid [1] | 118.4 |
| Naphthenic diluent oil [2] | 52.8 |
| Diphenylalkane diluent oil [3] | 10 |
| Methoxy ethanol [4] | 300 |
| Methoxy ethanol solution of barium oxide [5] | 213 |
| Water, 7.0 ml.[6] | |

[1] This material was a hexane solution of sulfonic acids prepared from two types of alkylates. It contained about 60 weight percent of sulfonic acid prepared from an alkylbenzene which was prepared by alkylating benzene with an alpha-olefin mixture wherein the olefins contained over 20 carbon atoms and were predominantly straight-chained and 40 weight percent of sulfonic acid prepared from an alkylbenzene which was predominantly di-n-alkylbenzenes. The hexane solution of sulfonic acid had the following analysis:

| Combining weight (as acid) | 466 |
|---|---|
| Sulfonic acidity, meq./g. | 0.559 |
| Nonvolatiles, weight percent | 32.9 |

[2] Having a viscosity of 300 S.S.U. at 100° F.
[3] A distillate fraction resulting from the production of "NAB Bottoms," as described hereinbefore. The fraction contains predominantly diphenylalkanes, and, typically, has a molecular weight in the range of about 230 to about 240.
[4] Process solvent.
[5] Containing 22 percent by weight barium.
[6] This provided an amount of water equal to 1.3 moles per mole of overbasing barium.

Process: The sulfonic acid, naphthenic diluent oil, diphenyl alkane diluent oil, methoxy ethanol, and water were added to a reaction vessel. While admixing the materials with mechanical agitation this mixture was heated to 45–55° C. whereupon the entire amount of methoxy ethanol solution of barium oxide was added. The resulting admixture was heated to a pot temperature of 90–93° C. (This resulted in removal of some volatiles.) The admixture was then blown with gaseous $CO_2$ for 18.3 minutes (rate 265 ml. per minute). This provided about 74 percent of the total amount of $CO_2$ required to react with the excess barium present. Blowing with $CO_2$ was discontinued and the partially carbonated admixture was heated to a pot temperature of 120–122° C. (This resulted in removal of additional volatile material.) While maintaining the temperature at about 120–122° C. it was blown with gaseous $CO_2$ for 15 minuutes (170 ml. $CO_2$ per minute). While continuing to blow the carbonated mixture with $CO_2$ gas it was heated to a pot temperature of 150° C. to remove substantially all of the remainder of the volatile materials. While maintaining the temperature at about 150° C. the admixture was blown with $CO_2$ for 30 minutes.

The product was fluid and bright and had the following analysis:

| Base number, acetic | 176 |
|---|---|
| Barium, weight percent | 24.1 |
| B.S. & W. | 0.04 |
| Viscosity at 210° F., cs. | 46.96 |
| Compatability (bright stock) | OK |

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A process for preparing a highly basic barium-containing dispersion having an acetic base number of at least 140 and a viscosity below 1600 cs. at 100° F., wherein the process comprises:
  (a) forming an admixture consisting essentially of:
    (i) about 5 to about 55 parts by weight oil-soluble dispersing agent selected from the group consisting of sulfonic acids, carboxylic acids and alkali and alkaline earth metal salts thereof,
    (ii) about 15 to about 85 parts by weight nonvolatile diluent having a boiling point of 160° C. and above,
    (iii) an organic process solvent boiling below 150° C.,
    (iv) an alcoholic solution of basic barium compound in sufficient amount to provide a stoichiometric excess of barium in the admixture, wherein the alcohol is selected from the group consisting of ether alcohols containing 3 or 4 carbon atoms and aliphatic monohydric alcohols containing 1 to 5 carbon atoms,
    (v) from about 0.25 to about 3 moles of water per mole of excess barium present in the admixture;
  (b) carbonating the admixture while it is maintained at a temperature of about 80 to about 100° C. wherein the amount of carbonation is from about 50 to about 85 percent of the total amount required to convert the excess barium present to barium carbonate;
  (c) heating the carbonated admixture to a temperature of about 115°–130° C. and adding the remainder of the amount of carbon dioxide required to substantially convert the excess barium to barium carbonate; an
  (d) heating the carbonated admixture to above about 150° C., to remove the volatile materials present, said process being characterized further in that the amount of process solvent in step (a)(iii) is at least 40 percent by weight of the weight of the dispersing agent, nonvolatile diluent, and alocholic solution of basic barium compound.

2. The process of claim 1 wherein the process solvent is selected from the group consisting of petroleum naphtha, heptane, hexane, octane, benzene, toluene, xylene and ether alcohols containing 3 or 4 carbon atoms.

3. The process of claim 2 wherein the nonvolatile diluent is selected from the group consisting of mineral lubricating oils and synthetic lubricating oils.

4. The process of claim 3 wherein the oil-soluble dispersing agent is a sulfonic acid.

5. The process of claim 4 wherein the process solvent is methoxy ethanol.

6. The process of claim 5 wherein the alcoholic solution of basic barium compound is a methoxy ethanol solution of barium oxide.

7. The process of claim 5 wherein the alcoholic solutin of basic barium compound is a methanolic solution of barium oxide.

8. The process of claim 6 wherein the non-volatile diluent is a mineral lubricating oil.

9. A process for preparing a highly basic barium-containing dispersion, said dispersion being fluid at ambient temperature and having an acetic base number of at least 140 and wherein the process comprises:

(a) forming an admixture consisting essentially of:
    (i) about 5 to about 55 parts by weight oil soluble dispersing agent selected from the group consisting of sulfonic acids, carboxylic acids and the alkali and akaline earth metal salts thereof,
    (ii) about 15 to about 85 parts by weight nonvolatile diluent having a boiling point of 160° C. and above,
    (iii) an organic process solvent boiling below 150° C.,
    (iv) from about 0.25 to about 3 moles of water per mole of excess barium used in the process;
  (b) heating the admixture to a temperature of from about 20 to about 60° C. and adding thereto an ether alcohol solution of basic barium compound in sufficient amount to provide a stoichiometric excess of barium in the admixture, said ether alcohol containing 3 or 4 carbon atoms;
  (c) carbonating the admixture while it is maintained at a temperature of about 80 to about 100° C. wherein the amount of carbonation is from about 50 to about 85 percent of the amount required to convert the excess barium present to barium carbonate;
  (d) heating the carbonated admixture to a temperature in the range of about 115 to about 130° C. and adding thereto the remainder of the amount of $CO_2$ required to substantially convert the excess barium to barium carbonate; and
  (e) heating the carbonated admixture to above about 150° C., to remove the volatile materials present, said process being characterized further in that the amount of process solvent in step (a)(iii) is at least 40 percent by weight of the weight of the dispersing agent, nonvolatile diluent, and alcoholic solution of basic barium compound.

10. The process of claim 9 wherein the process solvent is selected from the group consisting of petroleum naphtha, heptane, hexane, octane, benzene, toluene, xylene and ether alcohols containing 3 or 4 carbon atoms.

11. The process of claim 10 wherein the oil-soluble dispersing agent is a sulfonic acid.

12. The process of claim 11 wherein the process solvent is methoxy ethanol.

13. The process of claim 12 wherein the alcoholic solution of basic barium compound is a methoxy ethanol solution of barium oxide.

14. The process of claim 9 wherein the admixture of step (a) contains from about 10 to about 30 parts by weight oil-soluble dispersing agent and about 20 to about 70 parts by weight nonvolatile diluent.

15. The process of claim 14 wherein the process solvent is selected from the group consisting of petroleum naphtha, heptane, hexane, octane, benzene, toluene, xylene and ether alcohols containing 3 or 4 carbon atoms.

16. The process of claim 15 wherein (1) the oil-soluble dispersing agent is a sulfonic acid, (2) the process solvent is methoxy ethanol, and (3) the alcoholic solution of basic barium compound is a methoxy ethanol solution of barium oxide.

17. The process of claim 16 wherein in step (c) the temperature of carbonation is from about 88 to about 92° C. and the degree of carbonation is from about 60 to about 70 percent of the amount required to convert the excess barium present to barium carbonate.

18. The process of claim 17 wherein the temperature of carbonation in step (d) is from about 118 to about 123° C.

19. The process of claim 18 wherein the non-volatile diluent is a mineral lubricating oil.

20. The process of claim 18 wherein the non-volatile diluent is a synthetic lubricating oil.

21. The process of claim 18 wherein the non-volatile diluent is Stoddard solvent.

22. The process of claim 18 wherein the non-volatile diluent is diesel fuel.

23. A process for preparing a highly basic barium-containing dispersion, said dispersion being fluid at ambient temperature and having an acetic base number of at least 140, wherein the process comprises:

(a) forming an admixture consisting essentially of:
(i) about 5 to about 55 parts by weight oil-soluble dispersing agent selected from the group consisting of sulfonic acid, carboxylic acid and the alkali and alkaline earth metal salts thereof,
(ii) about 15 to about 85 parts by weight nonvolatile diluent having a boiling point of 160° C. and above,
(iii) an organic process solvent boiling below 150° C.;
(b) adding to the admixture a $C_1$–$C_5$ aliphatic monohydric alcoholic solution of basic barium compound in sufficient amount to provide a stoichiometric excess of barium in the admixture;
(c) heating the admixture to a temperature of from about 80 to about 100° C. and adding thereto from about 0.25 to about 3 moles of water per mole of excess barium present;
(d) carbonating the admixture while it is maintained at a temperature of from about 80 to about 100° C., with the amount of carbonation being from about 50 to about 85 percent of the amount required to convert the excess barium present to barium carbonate;
(e) heating the carbonated admixture to a temperature in the range of about 115 to about 130° C. and adding thereto the remainder of the amount of $CO_2$ required to substantially convert the excess barium to barium carbonate; and
(f) heating the carbonated admixture to above about 150° C. to remove the volatile materials present, said process being characterized further in that the amount of process solvent in step (a)(iii) is at least 40 percent by weight of the weight of the dispersing agent, nonvolatile diluent, and alcoholic solution of basic barium compound.

24. The process of claim 23 wherein the process solvent is selected from the group consisting of petroleum naphtha, heptane, hexane, octane, benzene, toluene, xylene and ether alcohols containing 3 or 4 carbon atoms.

25. The process of claim 24 wherein the oil-soluble dispersing agent is a sulfonic acid.

26. The process of claim 25 wherein the process solvent is methoxy ethanol.

27. The process of claim 26 wherein the alcoholic solution of basic barium compound is a methoxy ethanol solution of barium oxide.

28. The process of claim 23 wherein the admixture of step (a) contains from about 10 to about 30 parts by weight oil-soluble dispersing agent and about 20 to about 70 parts by weight nonvolatile diluent.

29. The process of claim 28 wherein the process solvent is selected from the group consisting of petroleum naphtha, heptane, hexane, octane, benzene, toluene, xylene and ether alcohols containing 3 or 4 carbon atoms.

30. The process of claim 29 wherein (1) the oil-soluble dispersing agent is a sulfonic acid, (2) the process solvent is methoxy ethanol, and (3) the alcoholic solution of basic barium compound is a methoxy ethanol solution of barium oxide.

31. The process of claim 30 wherein in step (c) the temperature of carbonation is from about 88 to about 92° C. and the degree of carbonation is from about 60 to about 70 percent of the amount required to convert the excess barium present to barium carbonate.

32. The process of claim 31 wherein the temperature of carbonation in step (d) is from about 118 to about 123° C.

33. The process of claim 32 wherein the non-volatile diluent is a mineral lubricating oil.

34. The process of claim 32 wherein the non-volatile diluent is a synthetic lubricating oil.

35. The process of claim 32 wherein the non-volatile diluent is Stoddard solvent.

36. The process of claim 32 wherein the non-volatile diluent is diesel fuel.

References Cited

UNITED STATES PATENTS

| | | | |
|---|---|---|---|
| 3,525,599 | 8/1970 | Nield | 44—51 |
| 2,861,951 | 11/1958 | Carlyle | 252—33 |
| 3,057,896 | 10/1962 | Schlicht et al. | 252—18 X |
| 3,609,076 | 9/1971 | Sabol et al. | 44—51 X |

PATRICK P. GARVIN, Primary Examiner

U.S. Cl. X.R.

252—33, 39, 40, 40.7, 44, 51